(12) United States Patent
Dhenaut et al.

(10) Patent No.: US 7,804,249 B2
(45) Date of Patent: Sep. 28, 2010

(54) LIGHT-TRANSMITTING SUBSTRATE PROVIDED WITH A LIGHT-ABSORBING COATING, LIGHT ABSORBING COATING AS WELL AS METHOD OF PREPARING A LIGHT-ABSORBING COATING

(75) Inventors: Matthieu Dhenaut, Chartres (FR); Abraham Rudolf Balkenende, Eindhoven (NL); Virginie Mercier, Eindhoven (NL); Jean-Sebastien Straetmans, Chartres (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 869 days.

(21) Appl. No.: 11/575,080

(22) PCT Filed: Sep. 12, 2005

(86) PCT No.: PCT/IB2005/052974

§ 371 (c)(1),
(2), (4) Date: Mar. 12, 2007

(87) PCT Pub. No.: WO2006/030369

PCT Pub. Date: Mar. 23, 2006

(65) Prior Publication Data

US 2008/0093969 A1   Apr. 24, 2008

(30) Foreign Application Priority Data

Sep. 15, 2004   (EP) .................................. 04300600

(51) Int. Cl.
*H01J 61/35* (2006.01)
*H01J 5/16* (2006.01)

(52) U.S. Cl. ...................................... 313/635; 313/112
(58) Field of Classification Search ................. 313/635, 313/110–112
See application file for complete search history.

(56) References Cited

U.S. PATENT DOCUMENTS

| 3,775,161 | A | 11/1973 | Martyny et al. |
| 5,627,426 | A | 5/1997 | Whitman et al. |
| 6,538,364 | B1 | 3/2003 | Shaw |
| 6,819,049 | B1 | 11/2004 | Bohmer et al. |

FOREIGN PATENT DOCUMENTS

| DE | 10127494 A1 | 3/2003 |
| EP | 0617300 A1 | 6/1994 |
| EP | 1172342 A1 | 1/2002 |
| WO | 0120641 A1 | 3/2001 |
| WO | 0197253 A1 | 12/2001 |
| WO | 03023816 A2 | 3/2003 |

Primary Examiner—Joseph L Williams

(57) ABSTRACT

The present invention relates to a light-transmitting substrate (1) which is at least provided with a light-absorbing coating (3). The light-absorbing coating comprises stabilized pigments which are incorporated in a sol-gel matrix. The light absorbing coating comprises silica particles having a size between 5 and 100 nanometers and alumina particles having a size between 5 and 50 nanometers. The total volume concentration of pigments, silica and alumina particles in the light-absorbing coating is between 20 and 65 percent. The volume concentration of silica particles is between 5 and 40 percent and the volume concentration of alumina particles between 1 and 15 percent.

12 Claims, 2 Drawing Sheets

LIGHT-TRANSMITTING SUBSTRATE PROVIDED WITH A LIGHT-ABSORBING COATING, LIGHT ABSORBING COATING AS WELL AS METHOD OF PREPARING A LIGHT-ABSORBING COATING

FIELD OF THE INVENTION

The present invention relates to a light-transmitting substrate that is at least partly provided with a light-absorbing coating, said light-absorbing coating comprising stabilized pigments which are incorporated in a sol-gel matrix.

The invention further relates to an electric lamp comprising a light-transmitting lamp vessel that accommodates a light source, wherein said lamp vessel comprises the above light-transmitting substrate.

Furthermore the present invention relates to the light absorbing coating itself, as well as to a method of preparing this light absorbing coating.

The invention finds its application, for example, in lamps used for automotive applications.

BACKGROUND OF THE INVENTION

Light-transmitting substrates provided with a light absorbing coating can be used as a color layer on or in front of lamps for general lighting purposes. The substrate may comprise, for example, a colored filter made of a piece of glass, which is flat or non-flat and which is designated to be placed on trajectory of light, said light being generated by a lamp. Such application is often used in outdoor lighting. Another example of a light-transmitting substrate is a lamp vessel that is placed over a light source of an electric lamp. Such electric lamps are predominantly used as indicator lamps in vehicles, for example as red-colored light source in red tail and brake lights of automobiles. Said electric lamps can also be used in traffic lights.

An electric lamp of the type mentioned in the opening paragraph is known from WO 01/20641 as filed by the present applicant.

The electric lamp according to WO 01/20641 is provided with an optically transparent, non-scattering, light-absorbing coating in which pigments are incorporated in a sol-gel matrix and which can resist temperatures up to 400° C. The sol-gel matrix in which the pigments are incorporated can reach a maximum layer thickness of about 500-800 nm when tetraethoxy silane (TEOS) is used as a sol-gel precursor and a maximum layer thickness of about 2-3 µm when methyltrimethoxy silane (MTMS) is used as a sol-gel precursor. The thickness of the light-absorbing coating, and in particular its critical layer thickness, is important. Actually, if the critical layer thickness is low, the light absorbing coating may crack and thus peel off. It is known from WO 01/20641 that addition of nano-sized silica particles in the light absorbing coating makes it possible to obtain thicker coatings which bond well to the lamp vessel.

However, the light absorbing coating of WO 01/20641 shows a relatively low scratch resistance. As a consequence, the coating may be scratched during the manufacturing process of the lamp, for example when clicking the lamp vessel on its cap. The coating may also be damaged during packing of the lamp, or mounting of the lamp in a luminary. This leads to a color point change, which may lead to a non-conform product.

SUMMARY OF THE INVENTION

It is an object of the invention to provide a light-transmitting substrate provided with a light-absorbing coating, wherein said light absorbing coating has a relatively large critical layer thickness and shows an increased scratch resistance.

To this end, the invention proposes a light-transmitting substrate which is at least provided with a light-absorbing coating, said light-absorbing coating comprising stabilized pigments which are incorporated in a sol-gel matrix, said light absorbing coating comprising silica particles having a size between 5 and 100 nanometers and alumina particles having a size between 5 and 50 nanometers, wherein the total volume concentration of pigments, silica and alumina particles in the light-absorbing coating is between 20 and 65 percent, the volume concentration of silica particles between 5 and 40 percent and the volume concentration of alumina particles between 1 and 15 percent.

According to the invention, the light-absorbing coating comprises silica particles. This increases the critical layer thickness. The light-absorbing coating further comprises alumina particles. This improves the scratch resistance. It is essential that the sizes of the alumina and silica particles be in the abovementioned ranges. Actually, a light-absorbing coating that is suitable for a light-transmitting substrate can only be obtained with particle sizes in these ranges. Otherwise, the light absorbing coating will scatter light, which is to be avoided in a light transmitting substrate used, for example, in automotive applications.

A light absorbing coating suitable for such applications can also only be obtained if the volume concentrations of the pigments and particles are chosen in the abovementioned ranges. Otherwise, the scratch resistance of the coating will be too low, and the coating will be non-transparent, as the particles will precipitate in the light-absorbing coating.

Preferably, the size of the silica particles is between 10 and 30 nanometers. This leads to a better increase of the critical layer thickness.

Advantageously, the size of the alumina particles is between 10 and 30 nanometers. This leads to a better improvement of the scratch resistance.

Preferably, the total volume concentration of pigments, silica and alumina particles in the light-absorbing coating is between 35 and 55 percent. This leads to a better increase of the critical layer thickness and scratch resistance.

Advantageously, the volume concentration of silica particles in the light-absorbing coating is between 10 and 20 percent. This leads to a better increase of the critical layer thickness.

Preferably, the volume concentration of alumina particles in the light-absorbing coating is between 5 and 10 percent. This leads to a better improvement of the scratch resistance.

Advantageously, the silica particles are hydrophobic silica particles. This minimizes the scattering of the light absorbing coating.

The invention also relates to the light-absorbing coating itself, to an electric lamp comprising a light-transmitting lamp vessel that accommodates a light source, said lamp vessel comprising a light-transmitting substrate as described hereinbefore, to said lamp vessel itself and to a method of preparing a light absorbing coating. This method comprises the steps of:

preparing a pigment dispersion by mixing a pigment with an alcohol-comprising liquid
preparing a hydrolysis mixture comprising a silane which is subjected to a sol-gel process, said hydrolysis mixture further comprising silica particles having a size between 5 and 100 nanometers and alumina particles having a size between 5 and 50 nanometers mixing the pigment dispersion and the hydrolysis mixture in such a way that the total volume concentration of pigments, silica and alumina particles in the light-absorbing coating is between 20 and 65 percent, the volume concentration of silica particles between 5 and 40 percent and the volume concentration of alumina particles between 1 and 15 percent.

Advantageously, the silica particles are incorporated in the hydrolysis mixture in the form of a silica sol. This leads to a better increase of the critical layer thickness.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
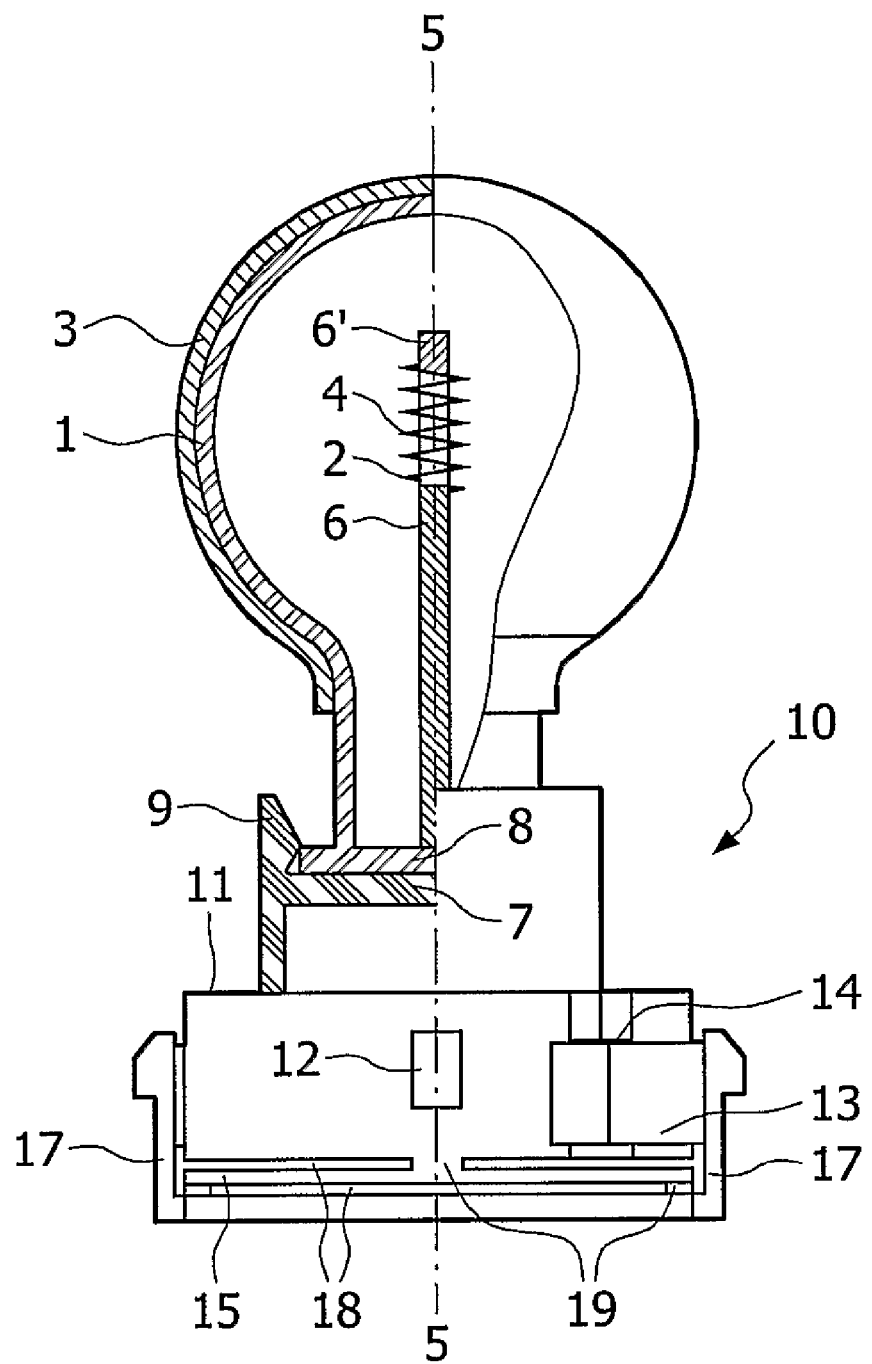
FIG. 1 is a side view, partly cut away and partly in cross-section, of an electric lamp in accordance with the invention comprising a lamp cap.

FIG. 1 shows an electric lamp in accordance with the invention, a part of which is shown in side view, partly cut away, and another part of which is shown in cross-section. The electric lamp comprises a light-transmitting lamp vessel 1, for example made of glass, which is closed in a gastight manner and in which an electric element 2, being a tungsten incandescent body with a center 4, is axially positioned on an axis 5 and is connected to current conductors 6 which issue from the lamp vessel to the exterior. The lamp shown has a filling of an inert gas, for example an Ar/Ne mixture, with a filling pressure slightly above 5 bar.

A lamp cap 10 is firmly connected to the lamp vessel 1. The lamp cap 10 has a synthetic resin housing 11. The housing 11 comprises a flat base portion 7 at least substantially perpendicular to the axis 5. The lamp vessel 1 is closed off in a gastight manner by means of a plate 8 of an insulating material, which plate lies in a plane at least substantially perpendicular to the axis 5. Electric element 2 is mounted in a previously defined position with respect to the plate 8 during the manufacture of the lamp. The plate 8 of the lamp vessel 1 is pressed home against the base portion by locking means 9, for example ridges, such that the electric element 2 will enter a previously defined position with respect to the reference means 12, for example studs. The studs 12 form part of the lamp cap and are designed to abut against a support 30, for example a reflector, as is visible in FIG. 2.

The lamp cap also comprises contact members 14 which are provided with a screen 13 and to which the current conductors 6 of the lamp vessel 1 are connected. A resilient intermediate portion 15, which is provided with coupling means 17, resilient tags in the Figure designed for coupling the reflector to the lamp cap, forms an integral whole with the housing 11. The resilient action of the intermediate portion is obtained in that the intermediate portion is made so as to be hollow, so that no more than a wall remains as the intermediate portion, whereupon a major portion of the wall is removed by means of two grooves 18 which run perpendicularly to the axis 5. The remaining portion of the wall forms a bridge 19, which is rotated, near the next groove, through an angle of, for example, 180° about the axis 5.

The lamp vessel 1 of the electric lamp has a relatively small axial dimension of approximately 22 mm and is suitable for consuming a relatively high power of, for example, 5 to 25 W. The electric lamp has a service life of approximately 6000 hours in this case.

In accordance with the invention, at least a part of the lamp vessel 1 is covered with a light-absorbing coating 3, which will be described in detail later on.

Figure 2:
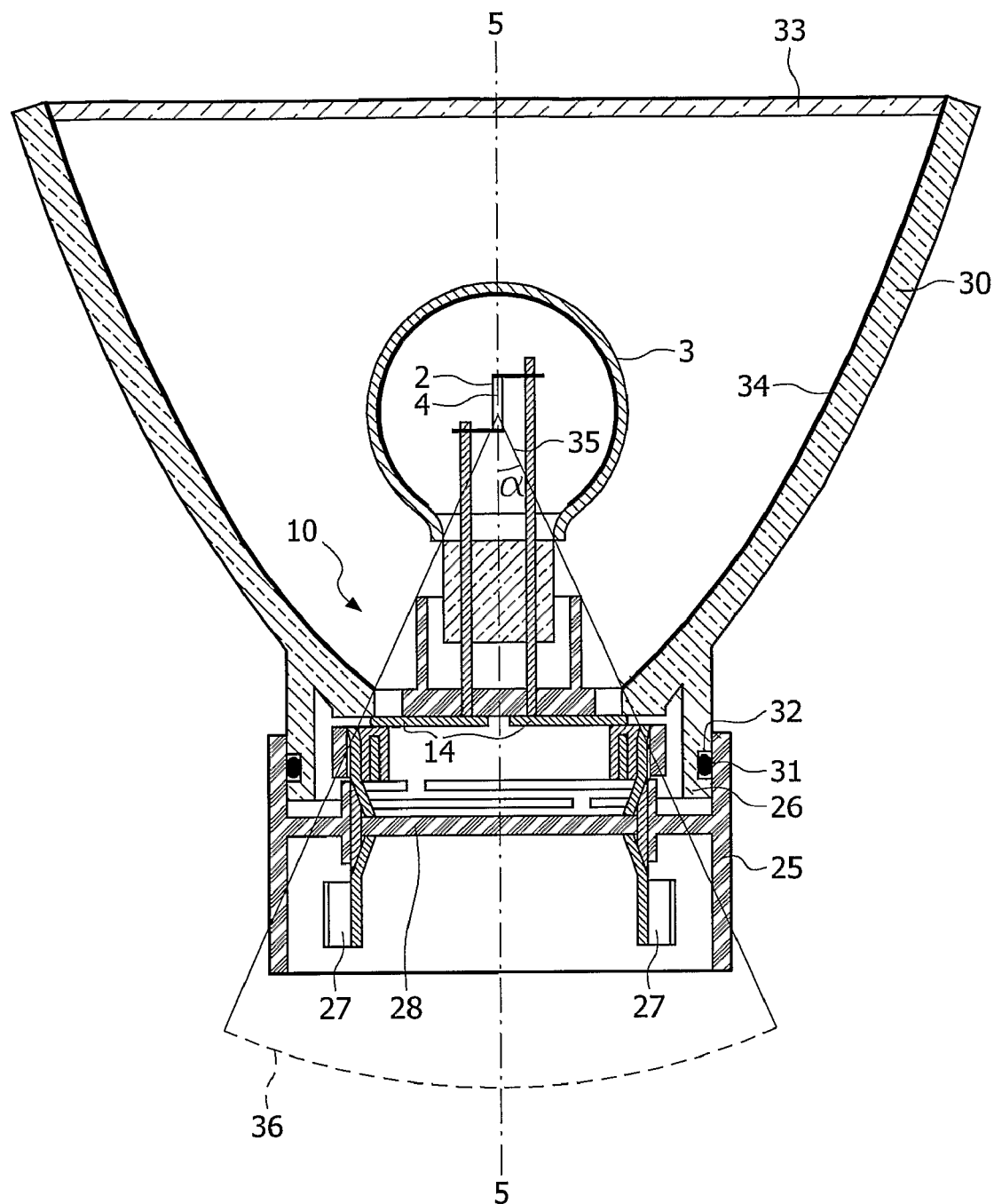
FIG. 2 shows an electric lamp provided with a reflector and an adapter

FIG. 2 shows the electric lamp provided with a support 30, being a reflector with a transparent plate 33 in the drawing, as well as with an adapter 25. In this configuration of a lamp with an adapter and a reflector, where the reflector is provided with a rubber ring 31 retained in a groove 32, the rubber ring seals off the opening 26 between the lamp cap and the reflector in a gastight manner. The adapter is provided with standardized contact points 27 which are passed through the bottom plate 28 of the adapter in a gastight manner and are connected to contact members 14 of the lamp cap 10.

It is visible in the drawing that the lamp cap 10 falls substantially entirely within a cone 36 which has its apex 35 in the center 4 of the electric element 2 and has an apex half angle a of 25°. The light originating from the electric element 2 can reach the reflecting surface 34 substantially without obstruction and is reflected there at least substantially axially in the direction of the transparent plate 33.

Examples of light absorbing coatings as well as methods of preparing these light-absorbing coatings are described hereinafter.

EXAMPLE 1

5.6 g of Bindzil CAT220, 2 g of MTMS and 1.09 g of ethanol are stirred together for 30 minutes. Bindzil CAT220 is a product sold by Akzo Nobel, which comprises alumina particles and silica particles with a size less than 50 nm for the both particles. Alumina particles and silica particles are incorporated in a sol.

8 g of MTMS and 0.21 g of TEOS, completed by 4.12 g of water are combined and stirred for 3 hours. Then, the mixture is stored more than 1 week in a refrigerator for ageing.

Separately, 4.33 g of PV Fast red B and 4.63 g of Fe2O3 Sicotrans L2816 are mixed with respectively the same quantity of disperbyk-190. In each pigment dispersion, the previous pigment quantities are added to 9 g of water and 12.78 g of ethanol. The two solutions are milled for more than 12 hours on a roller bench with the help of 2 mm small yttrium-stabilised zirconia milling beads.

Just before spin-coating, 1 part of hydrolysis mixture is mixed with 3 parts of pigments dispersion, completed with 0.4 part of diacetone alcohol—the solvent for spin-coating. The substrates are dried and cured in a convection oven at 250° C. for 5 minutes.

Solutions with a total particle volume concentration in the final coating of 55% are thus prepared, composed by 10% volume of alumina/silica particles and 45% volume of pigments. In this light-absorbing coating, the volume concentration of alumina particles is 1% and the volume concentration of silica particles is 9%.

The measured critical layer thickness is up to 7.1 mm, which is much better than in a similar light absorbing coating that does not comprise silica and alumina particles, where the critical layer thickness is 3.6 mm. Measurements show that the scratch resistance is increased by a factor 4 in term of critical cracks force measured by micro-indentation with respect to a similar light absorbing coating that does not comprise silica and alumina particles.

EXAMPLE 2

For the hydrolysis mixture, 10 g of MTMS, 0.21 g of TEOS and 2 g of DP 5820 from Nano Technologies, which comprises silica particles with a size of 20 nm, are hydrolyzed with 8.08 g of demineralised water. After 30 minutes of stirring, 2.16 g of DP 5820 from Nano Technologies are added. The solution is stirred for 3 hours, and the pH is adjusted to 4.5-5 with some 1% of standard basic NH3 in water. Then, the mixture is kept more than 1 week in the fridge for ageing.

On the other hand, a pigment dispersion is also prepared, to have a final coating with a pigment volume concentration of 40% and a total particle concentration of 55%. Together, 3.85 g of PV Fast red B from Clariant and 4.11 g of Fe2O3 from Sicotrans L2816 from BASF and 1.33 g of CR 125 from Baikowski, which comprises Aluminium particles with a size of 20 nm, are mixed with 8.96 g of Disperbyk-190 from Byk-Chemie. 18 g of demineralised water, followed by 25.56 g of pure ethanol are added. The solution is dispersed and grinded for more than 6 hours in Dispermat with the help of 1 mm small yttrium-stabilised zirconia milling beads.

Just before spray-coating, the hydrolysis mixture and the pigment dispersion are mixed together completed by 7.44 g of a so called wetting agent composed by 99.4% weight of butyldiglycol—the high boiling point solvent used for spray-coating—and 0.6% weight of L050 from Wacker. Then, the mixture is filtrated through a 5 mm filter before use.

The measured critical layer thickness is up to 6.8 mm, which is much better than in a similar light absorbing coating that does not comprise silica and alumina particles, where the critical layer thickness is 3.6 mm. Measurements show that the scratch resistance is increased by a factor 4 in term of critical cracks force measured by micro-indentation with respect to a similar light absorbing coating that does not comprise silica and alumina particles.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A light-transmitting substrate (1) which is at least provided with a light-absorbing coating (3), said light-absorbing coating comprising stabilized pigments which are incorporated in a sol-gel matrix, said light absorbing coating comprising silica particles having a size between 5 and 100 nanometers and alumina particles having a size between 5 and 50 nanometers, wherein the total volume concentration of pigments, silica and alumina particles in the light-absorbing coating is between 20 and 65 per cent, the volume concentration of silica particles between 5 and 40 per cent and the volume concentration of alumina particles between 1 and 15 per cent.

2. A light-transmitting substrate as claimed in claim 1, wherein the size of the silica particles is between 10 and 30 nanometers.

3. A light-transmitting substrate as claimed in claim 1, wherein the size of the alumina particles is between 10 and 30 nanometers.

4. A light-transmitting substrate as claimed in claim 1, wherein the total volume concentration of pigments, silica and alumina particles in the light-absorbing coating is between 35 and 55 per cent.

5. A light-transmitting substrate as claimed in claim 1, wherein the volume concentration of silica particles in the light-absorbing coating is between 10 and 20 per cent.

6. A light-transmitting substrate as claimed in claim 1, wherein the volume concentration of alumina particles in the light-absorbing coating is between 5 and 10 per cent.

7. A light-transmitting substrate as claimed in claim 1, wherein the silica particles are hydrophobic silica particles.

8. A light-absorbing coating comprising stabilized pigments which are incorporated in a sol-gel matrix, said light absorbing coating comprising silica particles having a size between 5 and 100 nanometers and alumina particles having a size between 5 and 50 nanometers, wherein the total volume concentration of pigments, silica and alumina particles in the light-absorbing coating is between 20 and 65 per cent, the volume concentration of silica particles between 5 and 40 per cent and the volume concentration of alumina particles between 1 and 15 per cent.

9. An electric lamp comprising a light-transmitting lamp vessel (1) that accommodates a light source (2), said lamp vessel comprising a light-transmitting substrate according to claim 1.

10. A lamp vessel provided with a light-absorbing coating as claimed in claim 8.

11. A method of preparing a light absorbing coating, said method at least comprising the steps of
preparing a pigment dispersion by mixing a pigment with an alcohol-comprising liquid
preparing a hydrolysis mixture comprising a silane wich is subjected to a sol-gel process, said hydrolysis mixture further comprising silica particles having a size between 5 and 100 nanometers and alumina particles having a size between 5 and 50 nanometers
mixing the pigment dispersion and the hydrolysis mixture in such a way that the total volume concentration of pigments, silica and alumina particles in the light-absorbing coating is between 20 and 65 per cent, the volume concentration of silica particles between 5 and 40 per cent and the volume concentration of alumina particles between 1 and 15 per cent.

12. A method as claimed in claim 11, wherein the silica particles are incorporated in the hydrolysis mixture in the form of a silica sol.

* * * * *